(12) United States Patent
Nishizawa et al.

(10) Patent No.: US 7,847,912 B2
(45) Date of Patent: Dec. 7, 2010

(54) LCD DEVICE WITH PLURAL FLUORESCENT TUBE BACKLIGHT FOR A RECTANGULAR CURVED DISPLAY SURFACE OF A RADIUS OF FROM TWO TO FOUR TIMES AS LARGE AS THE LENGTH OF THE SHORT-SIDE OF THE RECTANGULAR DISPLAY REGION

(75) Inventors: Shigeki Nishizawa, Mobara (JP);
Nobuyuki Koganezawa, Chiba (JP);
Fumiyuki Sato, Kamogawa (JP)

(73) Assignees: Hitachi Displays, Ltd., Chiba-Ken (JP);
Hitachi Displays Devices, Ltd.,
Chiba-Ken (JP)

( * ) Notice: Subject to any disclaimer, the term of this patent is extended or adjusted under 35 U.S.C. 154(b) by 235 days.

(21) Appl. No.: 12/131,164

(22) Filed: Jun. 2, 2008

(65) Prior Publication Data
US 2008/0303976 A1  Dec. 11, 2008

(30) Foreign Application Priority Data
Jun. 5, 2007  (JP) .............................. 2007-149333

(51) Int. Cl.
*G02F 1/1333*  (2006.01)
(52) U.S. Cl. ...................... 349/160; 349/61; 349/70; 349/158; 362/97.2; 362/217.08

(58) Field of Classification Search ................... 349/61, 349/62, 70, 71, 158, 160; 362/97.1, 97.2, 362/217.08
See application file for complete search history.

(56) References Cited

U.S. PATENT DOCUMENTS 7,190,503 B2 * 3/2007 Ide .............................. 359/245
2009/0201666 A1 * 8/2009 Takata et al. ............... 362/97.1

OTHER PUBLICATIONS

H. Sato et. al. "A4-Sized LCDs with Flexible Light Guide Plate" International Display Workshop (IDW) 06.

* cited by examiner

*Primary Examiner*—John Heyman
(74) *Attorney, Agent, or Firm*—Antonelli, Terry, Stout & Kraus, LLP.

(57) ABSTRACT

A liquid crystal display panel includes a TFT substrate and a color filter substrate respectively formed of a glass substrate. By housing the liquid crystal display panel in the inside of a frame having a curved surface, a predetermined curved surface is imparted to a display screen. Using a direct backlight having a plurality of fluorescent lamps, distances between the respective fluorescent lamps and the liquid crystal display panel are set to a fixed value. A diffusion plate has a curved surface substantially equal to the display screen. By mounting respective optical sheets on the diffusion plate, predetermined curved surfaces are imparted to the respective optical sheets. Due to such constitution, it is possible to realize a liquid crystal display device having a curved surface without using a complicated optical system.

10 Claims, 8 Drawing Sheets

LCD DEVICE WITH PLURAL FLUORESCENT TUBE BACKLIGHT FOR A RECTANGULAR CURVED DISPLAY SURFACE OF A RADIUS OF FROM TWO TO FOUR TIMES AS LARGE AS THE LENGTH OF THE SHORT-SIDE OF THE RECTANGULAR DISPLAY REGION

The present application claims priority from Japanese applications JP2007-149333 filed on Jun. 5, 2007, the content of which is hereby incorporated by reference into this application.

BACKGROUND OF THE INVENTION

The present invention relates to a display device or a liquid crystal display device, and more particularly to a liquid crystal display device having a curved display screen.

Thanks to several characteristics of a liquid crystal display device such as the reduction of thickness of the display device and the reduction of weight of the display device, a demand for a liquid crystal display device has been spreading to various applications ranging a computer display, a mobile phone terminal or the like to a television receiver set. It is also one of the characteristics of the liquid crystal display device that the liquid crystal display device has a planar screen.

On the other hand, from a viewpoint that the thickness of the liquid crystal display device can be reduced, the development for making use of the liquid crystal display device as a flexible display has been in progress. An example of such development is described in H. SATO et. al. "A4-Sized LCDs with Flexible Light Guide Plate" International Display Workshop (IDW) 06 (Non-patent document 1). According to this non-patent document 1, a liquid crystal display panel is constituted such that polymer-dispersion type ferroelectric liquid crystal is sandwiched between two plastic substrates and a gap is held between the substrates using polymer support columns. In this case, it is also necessary to make a backlight flexible. In non-patent document 1, the backlight is realized by arranging LEDs on a side of a flexible light guide plate.

SUMMARY OF THE INVENTION

Conventionally, the development of the flexible liquid crystal display aims at the development of the display which is flexible by itself. That is, the studies have been made on a presumption that the backlight is also made flexible. Accordingly, there is still no prospect for the realization of the flexible liquid crystal display with respect to a method for reducing a thickness of the whole display device or a method which makes the backlight flexible. To make the backlight flexible, the development of a material of a light guide plate for realizing a flexible light guide plate also becomes important.

Further, in forming the flexible light guide plate, it is necessary to make a light source flexible. In this case, it is necessary to arrange the LEDs on a side of the flexible light guide plate so as to direct light emitted from the LEDs toward a liquid crystal display panel side. To efficiently direct light emitted from the light source toward the liquid crystal display panel, an optical pattern is formed on a surface (one-side surface or both-side surfaces) of the light guide plate. Further, the light guide plate per se is also formed into a curved surface, designing of an optical pattern becomes extremely complicated.

As described above, in the conventional flexible display, the constitution of the backlight is particularly complicated and hence, for realizing the flexible liquid crystal display, there exist many drawbacks to be overcome in view of the development of materials, cost, reliability and the like. On the other hand, in an application such as amusement, there exists a demand for a display having a curved display screen. However, it is difficult for the above-mentioned flexible display device to readily cope with such an application.

Accordingly, it is an object of the present invention to provide a liquid crystal display device having a curved screen which is highly reliable and can be manufactured at a low cost.

With respect to a display having a curved display screen used in an application such as amusement, a demand for reduction of a thickness of the whole display is small. Further, it is unnecessary to make both of the display screen and the backlight flexible.

According to the liquid crystal display device of the present invention, it is possible to realize a display device having a curved display screen by bending a liquid crystal display panel, by forming a backlight using a plurality of fluorescent lamps, and by setting distances between the respective fluorescent lamps and the liquid crystal display panel to a fixed value. To describe specific means, they are as follows.

(1) According to a first aspect of the present invention, there is provided a liquid crystal display device which includes a liquid crystal display panel including a TFT substrate on which pixel electrodes and TFTs are formed, a color filter substrate on which color filters are formed, liquid crystal sandwiched between the color filter substrate and the TFT substrate, an upper polarizer adhered to an upper surface of the color filter substrate, and a lower polarizer adhered to a lower surface of the TFT substrate, and a backlight, wherein a display region of the liquid crystal display panel is formed into a curved surface, the backlight includes a light source and a curved diffusion plate, the light source includes a plurality of fluorescent lamps, and distances between the fluorescent lamps and the liquid crystal display panel are set to a fixed value.

(2) In the liquid crystal display device having the constitution (1), the distances between the liquid crystal display panel and the fluorescent lamps are, assuming an average of the distances between the respective fluorescent lamps and the liquid crystal display panel as m, set to a value which falls within a range of m±10%.

(3) In the liquid crystal display device having the constitution (1), the curved surface of the liquid crystal display panel and a curved surface of the diffusion plate agree with each other.

(4) In the liquid crystal display device having the constitution (1), the distances between the diffusion plate and the fluorescent lamps are, assuming an average of the distances between the respective fluorescent lamps and the diffusion plate as m, set to a value which falls within a range of m±10%.

(5) In the liquid crystal display device having the constitution (1), the TFT substrate and the color filter substrate are made of glass.

(6) In the liquid crystal display device having the constitution (1), the curved surface of the liquid crystal display panel and the curved surface of the diffusion plate are formed into a cylindrical shape.

(7) According to a second aspect of the present invention, there is provided a liquid crystal display device which includes a liquid crystal display panel including a TFT substrate on which pixel electrodes and TFTs are formed, a color filter substrate on which color filters are formed, liquid crystal sandwiched between the color filter substrate and the TFT substrate, an upper polarizer adhered to an upper surface of the color filter substrate, and a lower polarizer adhered to a lower surface of the TFT substrate, a frame housing the liquid crystal display panel by covering a peripheral portion of the liquid crystal display panel, and a backlight, wherein the frame has a curved surface, a display region of the liquid crystal display panel is formed into a curved surface, the backlight includes a light source and a curved diffusion plate, the light source includes a plurality of fluorescent lamps, and distances between the fluorescent lamps and the liquid crystal display panel are, assuming an average of distances between the respective fluorescent lamps and the liquid crystal display panel as m, set to a value which falls within a range of m±10%.

(8) In the liquid crystal display device having the constitution (7), the curved surface of the frame and a curved surface of the liquid crystal display panel agree with each other.

(9) In the liquid crystal display device having the constitution (7), the distances between the diffusion plate and the fluorescent lamps are, assuming an average of the distances between the respective fluorescent lamps and the diffusion plate as m, set to a value which falls within a range of m±10%.

(10) In the liquid crystal display device having the constitution (7), the TFT substrate and the color filter substrate are made of glass.

(11) According to a third aspect of the present invention, there is provided a liquid crystal display device which includes a liquid crystal display panel including a TFT substrate on which pixel electrodes and TFTs are formed, a color filter substrate on which color filters are formed, liquid crystal sandwiched between the color filter substrate and the TFT substrate, an upper polarizer adhered to an upper surface of the color filter substrate, and a lower polarizer adhered to a lower surface of the TFT substrate, and a backlight, wherein a display region of the liquid crystal display panel is formed into a cylindrical curved surface, the backlight includes a light source and a curved diffusion plate, the light source includes a plurality of fluorescent lamps, the fluorescent lamps have end portions thereof housed in a plurality of sockets made of resin and capable of housing the fluorescent lamps, an envelope which connects insertion holes of the sockets for housing the fluorescent lamps has a curvature equal to a curvature of the cylindrical curved surface, and distances between the fluorescent lamps and the liquid crystal display panel are, assuming an average of distances between the respective fluorescent lamps and the liquid crystal display panel as m, set to a value which falls within a range of m±10%.

(12) In the liquid crystal display device having the constitution (11), the curved diffusion plate is formed into a cylindrical curved surface, and distances between the diffusion plate and the fluorescent lamps are, assuming an average of distances between the respective fluorescent lamps and the diffusion plate as m, set to a value which falls within a range of m±10%.

(13) In the liquid crystal display device having the constitution (11), the plurality of sockets is arranged on a short side of the backlight, and the envelope which connects the insertion holes of the plurality of sockets for housing the fluorescent lamps has a curvature equal to a curvature of the cylindrical curved surface.

(14) According to a fourth aspect of the present invention, there is provided a liquid crystal display device which includes a liquid crystal display panel including a TFT substrate on which pixel electrodes and TFTs are formed, a color filter substrate on which color filters are formed, liquid crystal sandwiched between the color filter substrate and the TFT substrate, an upper polarizer adhered to an upper surface of the color filter substrate, and a lower polarizer adhered to a lower surface of the TFT substrate, and a backlight, wherein a display region of the liquid crystal display panel is formed into a rectangular curved surface which is recessed with respect to the outside, a curvature radius R of the display region in the long-side direction is twice to four times as large as a length H of the display region in the short-side direction, the backlight includes a light source and a curved diffusion plate, the light source includes a plurality of fluorescent lamps, and distances between the fluorescent lamps and the liquid crystal display panel are set to a fixed value.

(15) In the liquid crystal display device having the constitution (14), the distances between the fluorescent lamps and the liquid crystal display panel are, assuming an average of the distances between the respective fluorescent lamps and the liquid crystal display panel as m, set to a value which falls within a range of m±10%.

(16) In the liquid crystal display device having the constitution (14), the curved surface of the liquid crystal display panel and a curved surface of the diffusion plate agree with each other.

(17) In the liquid crystal display device having the constitution (14), the distances between the diffusion plate and the fluorescent lamps are, assuming an average of the distances between the respective fluorescent lamps and the diffusion plate as m, set to a value which falls within a range of m±10%.

(18) In the liquid crystal display device having the constitution (14), the TFT substrate and the color filter substrate are made of glass.

(19) In the liquid crystal display device having the constitution (14), the curved surface of the liquid crystal display panel and the curved surface of the diffusion plate are formed into a cylindrical shape.

(20) According to a fifth aspect of the present invention, there is provided a liquid crystal display device which includes a liquid crystal display panel including a TFT substrate on which pixel electrodes and TFTs are formed, a color filter substrate on which color filters are formed, liquid crystal sandwiched between the color filter substrate and the TFT substrate, an upper polarizer adhered to an upper surface of the color filter substrate, and a lower polarizer adhered to a lower surface of the TFT substrate, a frame housing the liquid crystal display panel by covering a peripheral portion of the liquid crystal display panel, and a backlight, wherein the frame is formed into a cylindrical curved surface which is recessed with respect to the outside, a display region of the liquid crystal display panel is formed into a cylindrical curved surface which is recessed with respect to the outside, the backlight includes a light source and a curved diffusion plate, the light source includes a plurality of fluorescent lamps, and distances between the fluorescent lamps and the liquid crystal display panel are, assuming an average of the distances between the respective fluorescent lamps and the liquid crystal display panel as m, set to a value which falls within a range of m±10%, and the TFT substrate and the color filter are made of glass.

According to the present invention, it is possible to manufacture the liquid crystal display device having the curved screen without using a complicated optical system. Further, according to the present invention, the liquid crystal display device having the curved display screen can be formed using parts which are not largely different from conventional constitutional parts basically and hence, the present invention can provide the highly reliable liquid crystal display device at an extremely low cost. Further, according to the present invention, it is possible to form the liquid crystal display device having the curved display screen using the glass substrate.

Still further, the present invention can easily manufacture the display device having the outwardly recessed curved surface. Accordingly, a drawback relating to a viewing angle of the liquid crystal display device can be overcome thus allowing even a liquid crystal display device having a large screen to form a clear image on the whole screen.

DESCRIPTION OF THE PREFERRED EMBODIMENTS

The present invention is explained in detail hereinafter in conjunction with embodiments.

Embodiment 1

Figure 1:
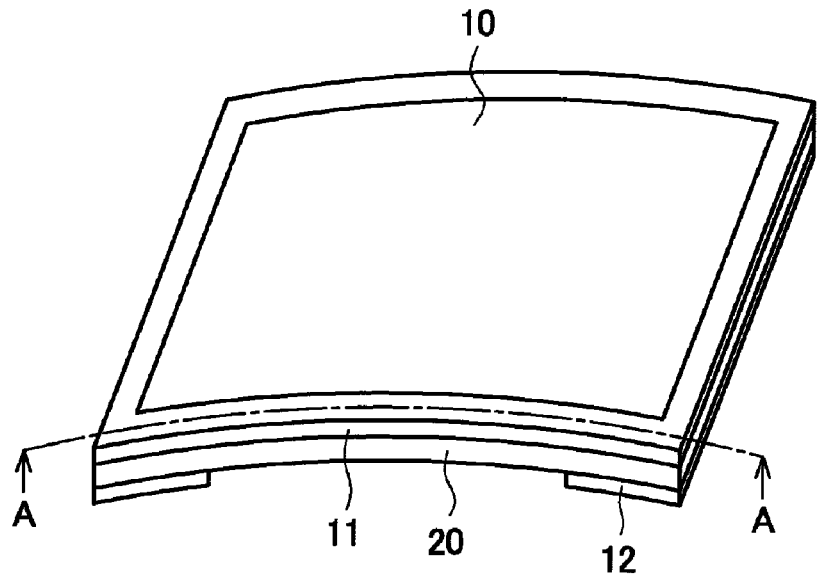
FIG. 1 is a schematic view of a liquid crystal display device of an embodiment 1.

FIG. 1 is a view showing an appearance of a display device of the embodiment 1. FIG. 1 shows a display having an outwardly projecting screen. Such a display device is used for amusement, that is, for a slot gaming machine or the like, for example. In FIG. 1, a liquid crystal display panel 10 is outwardly curved. As described in "non-patent document 1", the outwardly-curved liquid crystal display panel 10 may be formed of, for example, a substrate made of plastic. On the other hand, a substrate may be formed using glass and the glass substrate may be made thin to form a liquid crystal display panel 10 having a curved screen.

In FIG. 1, the liquid crystal display panel 10 is covered with a curved frame 11 except for a display part. A backlight 20 is arranged on a back surface of the liquid crystal display panel 10. The backlight 20 is, as described later, constituted of various optical parts and a light source. In this embodiment, the light source is constituted of fluorescent lamps. The fluorescent lamps are driven by inverters, and covers 12 of the inverters are mounted on a back surface of the backlight 20.

Figure 2A:
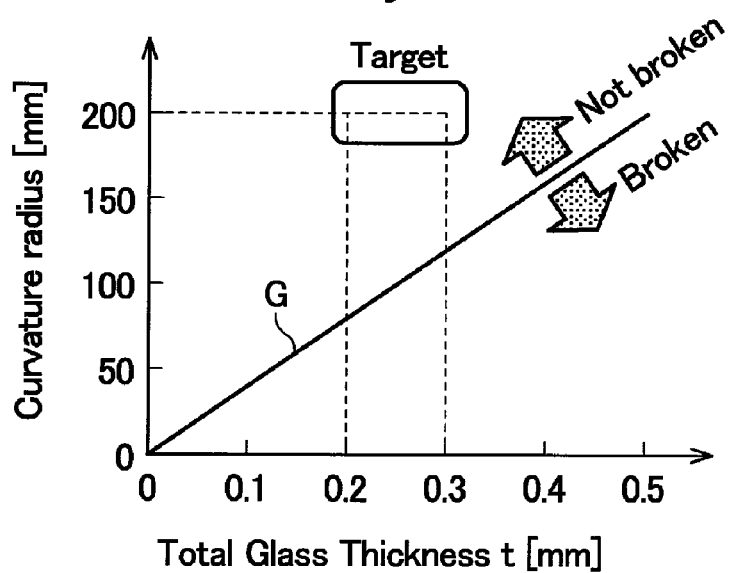
FIG. 2A and FIG. 2B are graphs showing the relationship between a curvature of a glass substrate and a thickness of the glass substrate.
Figure 2B:
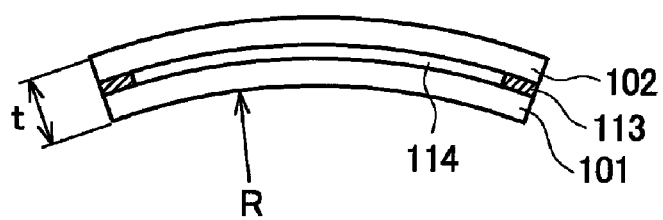

If the liquid crystal display panel 10 having a curved screen could be formed using the glass substrate, a conventional liquid crystal manufacturing technique can be used and hence, it is extremely advantageous to realize the enhancement of the reliability of the liquid crystal display device as well as the reduction of cost. The degree of bending of the glass substrate is determined depending on a plate thickness of the glass. FIG. 2A is a graph showing the relationship between the plate thickness of the liquid crystal display panel 10 and a range within which the glass can be bent without being broken. FIG. 2B is a view showing parameters used for determining the relationship in FIG. 2A. As shown in FIG. 2B, the liquid crystal display panel 10 includes a TFT substrate 101 on which TFTs and pixel electrodes are formed, a color filter substrate 102 on which color filters and the like are formed, and liquid crystal which is sandwiched between the TFT substrate 101 and the color filter substrate 102. Further, the liquid crystal is sealed in a space defined between the TFT substrate 101 and the color filter substrate 102 using a sealing material 113.

A thickness of the glass substrate which constitutes the liquid crystal display panel 10 is standardized to 0.7 mm or 0.5 mm, for example. Accordingly, to reduce a thickness of the glass substrate for acquiring a larger curvature, after forming the liquid crystal display panel 10, an outer side of the glass substrate is polished so as to reduce the thickness of the glass substrate. The glass substrate is polished by mechanical polishing or by chemical polishing. In this case, both of the TFT substrate 101 and the color filter substrate 102 are polished. Since a thickness of a liquid crystal layer 114 is several μm, to consider a total thickness t of the liquid crystal display panel, the thickness of the liquid crystal layer 114 can be ignored.

In FIG. 2A, a curvature radius of the liquid crystal display panel 10 is taken on an axis of ordinates. The curvature radius is, as shown in FIG. 2B, defined as a curvature radius of an inner side of the liquid crystal display panel 10. A glass thickness taken on an axis of abscissas in FIG. 2A indicates a total thickness t of the liquid crystal display panel 10. That is, in FIG. 2A, when the total glass thickness taken on an axis of abscissas is 0.2 mm, the thickness of the TFT substrate 101 or the thickness of the color filter substrate 102 is 0.1 mm.

In FIG. 2A, a straight line G indicates a breaking limit line. That is, when the relationship between the curvature radius and the total glass thickness exists below the straight line G, the glass substrate is broken, while when the relationship between the curvature radius and the total glass thickness exists on or above the straight line G, the glass substrate is not broken. Assuming the curvature radius as R and the thickness of the liquid crystal display panel as t, the straight line G assumes the relationship of R=400 t. That is, when the curvature radius R becomes equal to or less than 400 times as large as the thickness t, the glass substrate is broken. However, with the presence of flaws or the like in the glass substrate, even when the relationship between the curvature radius and the total glass thickness t exists slightly above the straight line G, the glass is broken. Accordingly, it is desirable that the tolerance twice as large as the straight line G is imparted to an actual product, and the product is used on the straight line which satisfies the relationship of R=800 t or in a region above such a straight line. In the actual product, the relationship between curvature radius and the total glass thickness of the glass substrate is set above the straight line G with sufficient tolerance as shown in FIG. 2A.

Figure 3:
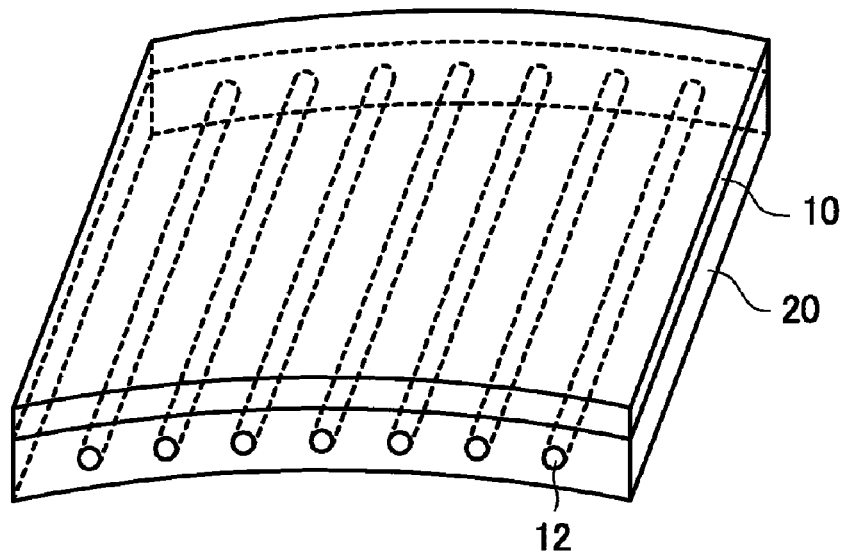
FIG. 3 is a perspective view showing an arrangement of fluorescent lamps in a see-through manner.

FIG. 3 is a view showing the liquid crystal display panel 10, the backlight 20 and the light source in a see-through manner. In FIG. 3, the backlight 20 is formed on a back surface of the liquid crystal display panel 10. The liquid crystal display panel 10 includes the TFT substrate, the color filter substrate, an upper polarizer adhered to an upper surface of the color filter substrate, and a lower polarizer adhered to a lower surface of the TFT substrate. In FIG. 3, however, the upper polarizer and the lower polarizer are not shown.

The backlight 20 includes optical parts such as a diffusion sheet, a diffusion plate, a prism sheet and a reflector. These optical parts are, however, also not shown in FIG. 3. In FIG. 3, fluorescent lamps 30 are used as the light source. In this embodiment, cold cathode ray tubes are used as the fluorescent lamps 30. With respect to the cold cathode ray tubes, a diameter of the tube can be made small, that is, 1.6 mm to 3.0 mm and hence, the cold cathode ray tubes are useful for reducing the thickness of the display device as a whole. On the other hand, to increase the brightness of the screen while leaving the thickness of the display device as it is, hot-cathode ray tubes which exhibit higher light emitting efficiency may be used.

FIG. 1 to FIG. 3 shows a case in which the display screen is formed into a cylindrical shape. A plurality of fluorescent lamps 30 is arranged in the direction perpendicular to the screen. The plurality of fluorescent lamps 30 is arranged along the curvature of the screen of the liquid crystal display panel 10. Due to such a constitution, distances between the respective fluorescent lamps 30 and the liquid crystal display panel 10 can be held at a fixed value, and the screen brightness can be made uniform over the whole screen. The optical parts can be designed substantially in the same manner as the optical parts used in a display device having a flat-screen thus also simplifying the constitution of the liquid crystal display device per se.

Figure 4:
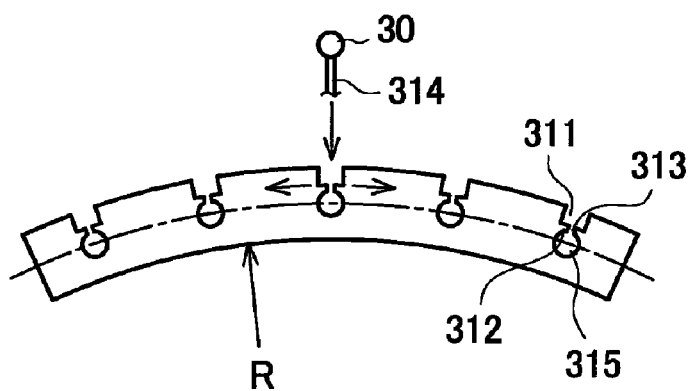
FIG. 4 is a front view of a socket in which the fluorescent lamps are inserted.

FIG. 4 shows an example of a socket 31 provided for arranging the fluorescent lamps 30 on the curved surface. The sockets 31 are provided for supplying an electric current to the fluorescent lamps 30 at end portions of the fluorescent lamps 30, and the end portions of the fluorescent lamps 30 are inserted into the sockets 31. A cable 314 for supplying the electric current from the outside is preliminarily connected to the fluorescent lamps 30 before the fluorescent lamps 30 are inserted into the sockets 31. The plurality of fluorescent lamps 30 is mounted on the socket 31 as a unit. A terminal of the fluorescent lamp 30 is connected to the cable 314 directed to the direction orthogonal to a terminal in the inside of the socket 31 by soldering.

The socket 31 is made of silicon rubber and a circle is formed when portions of the socket 31 in which the fluorescent lamps 30 are mounted are connected, wherein a radius R of the circle agrees with a radius R of a curved surface of the screen. That is, by preliminarily imparting the curvature radius to the socket 31, the curvature radius can be also easily imparted to the arrangement of the fluorescent lamps 30. Although one socket 31 may be sufficient in case of a small display, usually, several sockets 31 are arranged in parallel to each other. It is needless to say that the respective sockets 31 are arranged to maintain the curvature radius R of the fluorescent lamps 30.

In FIG. 4, an introducing portion 311 of the socket 31 is formed of a recessed portion and the fluorescent lamp 30 is inserted in the direction indicated by a white arrow into an insertion hole 315 in the socket 31 from the recessed portion. A pair of tongue portions 312 is formed below the introducing portion 311 and a slit 313 is formed between the tongue portions 312. The fluorescent lamp 30 is inserted into the tongue portions 312 by widening the slit 313 by pushing. After insertion of the fluorescent lamp 30, the fluorescent lamp 30 is covered with the tongue portions 312 so that the fluorescent lamp 30 can be fixed by the socket 31. An envelope R of the insertion holes 315 agrees with the curved surface R of the liquid crystal display panel 10.

Figure 5:
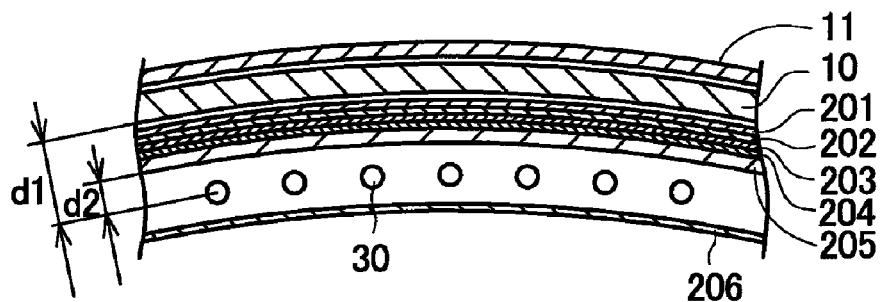
FIG. 5 is a cross-sectional view of the liquid crystal display device of the embodiment 1.

FIG. 5 is a cross-sectional view taken along a line A-A in FIG. 1 and shows the constitution of the liquid crystal display device in the cross-sectional direction. However, in FIG. 5, the depiction of inverters and the like is omitted. In FIG. 5, the liquid crystal display panel 10 is arranged below the frame 11. The frame 11 is made of metal and has a predetermined curvature radius. Although the liquid crystal display panel 10 is flat before being installed in the frame 11, the liquid crystal display panel 10 is bent to conform with the curvature radius of the frame 11 by being installed in the frame 11, and a display screen becomes a cylindrical curved surface.

Although not shown in FIG. 5, the liquid crystal display panel 10 is constituted of a TFT substrate, a color filter substrate, an upper polarizer adhered to the color filter substrate, and a lower polarizer adhered to the TFT substrate. It is necessary to arrange the relationship between a total plate thickness of the TFT substrate 101 and the color substrate 102 and the curvature radius above the straight line G shown in FIG. 2. Here, the strength of the liquid crystal display panel 10 is increased by an amount corresponding to the adhesion of the upper polarizer to the color filter substrate and the adhesion of the lower polarizer to the TFT substrate.

The backlight 20 is arranged below the liquid crystal display panel 10. An upper surface of the backlight 20 is also bent to agree with a curvature radius of the liquid crystal display panel 10. In the backlight 20, the fluorescent lamp 30 is formed of a cold cathode ray tube. As already explained in conjunction with FIG. 4, the fluorescent lamps 30 are arranged in the socket 31 such that the fluorescent lamps 30 agree with the display screen. The technical feature of the present invention lies in that distances d1 between the fluorescent lamps 30 which constitute the light sources and the liquid crystal display panel 10 are made to agree to each other with respect to respective fluorescent lamps 30 so that the uniform screen brightness can be acquired without using a complicated optical system even with a screen having a curved surface. Here, "d1" in FIG. 5 is a distance between the fluorescent lamp 30 and a lower polarizer of the liquid crystal display panel 10 not shown in the drawing. Further, "d1" may be a representative value measured at the center of the fluorescent lamp 30.

Out of optical members which constitute the backlight 20, respective optical sheets have small thicknesses ranging from several ten μm to hundred and several ten μm and are arranged in a stacked manner and hence, the optical sheets do not largely influence a distance between the light source and the liquid crystal display panel 10. A diffusion plate 205 is formed of a polycarbonate plate having a plate thickness of approximately 2 mm and has some rigidity. The diffusion plate 205 is formed to have the same curvature radius as the curved surface of the screen of the liquid crystal display panel 10 at the time of molding. Then, the respective optical sheets are bent along the diffusion plate 205.

In view of the above-mentioned constitution, to maintain the distance between the liquid crystal display panel 10 and the fluorescent lamps 30 at a fixed value, distances d2 between the fluorescent lamps 30 and the diffusion plate 205 may be set to a fixed value. In this case, "d2" may be a representative value measured at the center of the fluorescent lamp 30. To assemble the fluorescent lamps 30 into the socket 31, it is sufficient to accurately set the relative positional relationship between the socket 31 and the diffusion plate 205. However, when the screen is small, by accurately setting the distance between the socket 31 and the diffusion plate 205, the distances between the fluorescent lamps 30 and the diffusion plate 205 may be set to fixed values. However, when the screen is large, the diffusion plate 205 or the fluorescent lamps 30 is deflected and hence, the distance between the diffusion plate 205 and a phosphor screen may be changed.

Figure 6:
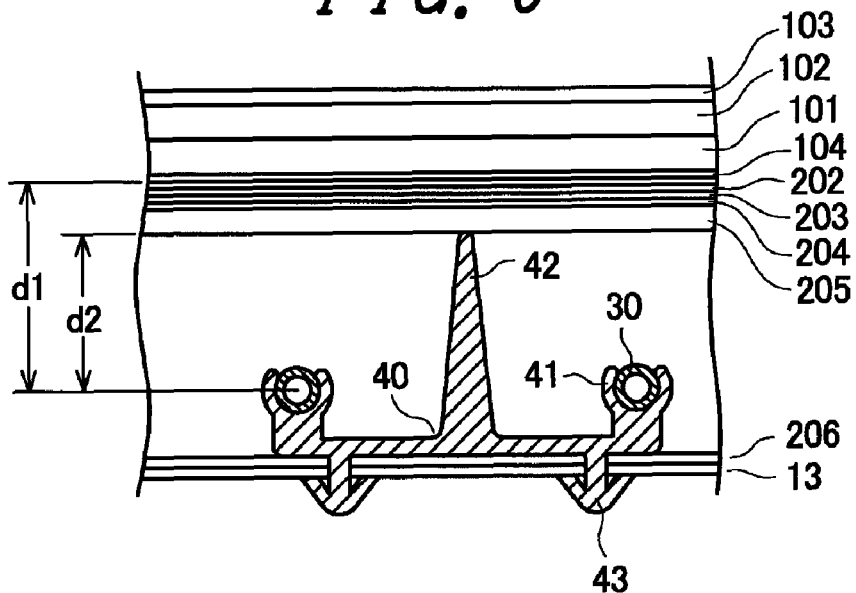
FIG. 6 is a cross-sectional view of an intermediate holder portion of the liquid crystal display device.

To prevent such a change of the distance, intermediate holders 40 shown in FIG. 6 are used. The intermediate holder 40 plays a role of supporting the fluorescent lamp 30 between two sockets 31 and a role of maintaining the distance between the fluorescent lamp 30 and the diffusion plate 205 to a fixed value. In FIG. 6, the fluorescent lamps 30 are inserted into fluorescent lamp holding portions 41 formed on left and right sides of the intermediate holder 40. That is, two fluorescent lamps 30 are supported on one intermediate holder 40. A spacer 42 is formed on a center portion of the intermediate holder 40. Due to the provision of the spacer 42, the distance between the fluorescent lamp 30 and the diffusion plate 205 is eventually set to a fixed value. Hooks 43 formed on a lower side of the intermediate holders 40 are engaged with preliminarily opened holes formed in the diffusion sheet and a rear cover 13 so as to support the intermediate holder 40.

The distances d2 between the fluorescent lamps 30 and a lower side of the diffusion plate 205 of this embodiment are set to approximately 10 mm. However, the distances d2 become irregular depending on errors in assembling, tolerances of parts or the like. It is desirable that irregularities of the distances d2 fall within a range of ±10%. That is, in this embodiment, in each fluorescent lamp 30, the distance between the diffusion plate 205 and a center portion of the fluorescent lamp 30 is preferably set to a value ranging from 9 mm to 11 mm when the distance d2 is set to 10 mm. Although the distance d1 is a distance between the fluorescent lamp 30 and a lower portion of the liquid crystal display panel 10, that is, the lower polarizer adhered to the TFT substrate, the distance d1 is automatically determined when the distance d2 is determined.

Figure 7A:
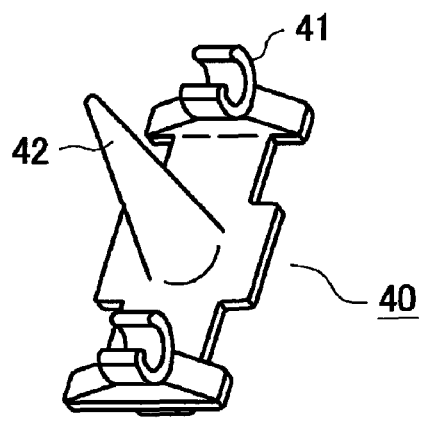
FIG. 7A and FIG. 7B are perspective views of the intermediate holder.
Figure 7B:
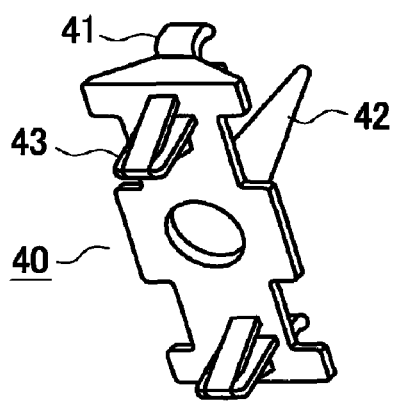

FIG. 7A and FIG. 7B are perspective views of the intermediate holder 40. FIG. 7A is the front-side perspective view of the intermediate holder 40 and FIG. 7B is the back-side perspective view of the intermediate holder 40. The intermediate holder 40 is made of polycarbonate. Since the intermediate holder 40 is formed by injection molding, the intermediate holder 40 can be accurately formed even when the intermediate holder 40 has a relatively complicated shape as shown in FIG. 7.

Figure 8:
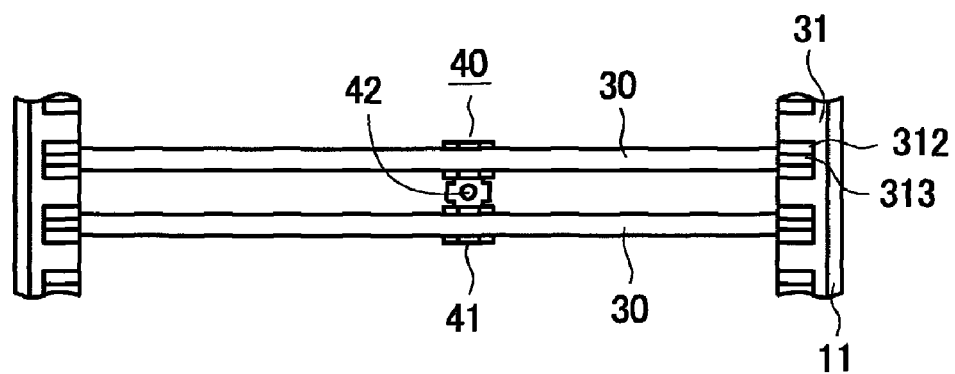
FIG. 8 is a plan view showing the relationship among the fluorescent lamps, the intermediate holder and the sockets.

FIG. 8 is a partial plan view showing a state in which the fluorescent lamps 30 are arranged in the inside of the backlight 20. In FIG. 8, the fluorescent lamp 30 has both ends thereof held by the sockets 31. FIG. 8 shows a state in which the fluorescent lamp 30 is housed in the socket 31 after expending by pushing the slit portion 313 between the tongue portions 312 formed on the recessed portion of the socket 31. FIG. 8 also shows a state in which center portions of two fluorescent lamps 30 are supported on fluorescent lamp holding portions 41 of the intermediate holder 40 having the spacer 42.

Returning now to FIG. 5, the constitution of an optical system of this embodiment is explained. As described previously, the fluorescent lamps 30 arranged in the socket 31 on a curved surface similar to the curved surface of the screen, and the distances between the respective fluorescent lamps 30 and the diffusion plate 205 are held at a fixed value. Out of light emitted from the fluorescent lamps 30, light which is emitted in the direction opposite to the liquid crystal display panel 10 is reflected on the reflection sheet 206 and is directed to the liquid crystal display panel 10. The light emitted from the fluorescent lamps 30 is firstly diffused by the diffusion plate 205 and becomes uniform light. That is, the diffusion plate 205 prevents a phenomenon that only portions corresponding to the fluorescent lamps 30 are brightened so that the brightness of the screen becomes non-uniform. Since the diffusion plate 205 diffuses light, transmissivity of light is sacrificed to some extent. Transmissivity of light of the diffusion plate 205 in this embodiment is approximately 70%. Light emitted from the diffusion plate 205 passes through the lower diffusion sheet 204. The lower diffusion sheet 204 plays a role of making light emitted from the diffusion plate 205 more uniform.

A lower prism is arranged on the lower diffusion sheet 204. For example, a large number of prisms which extend in the lateral direction of the screen are formed on a lower prism sheet 203 at a fixed pitch. Light which spreads in the longitudinal direction of the screen from the backlight 20 is focused in the direction perpendicular to the screen of the liquid crystal display panel 10. That is, the front brightness can be increased with the use of the prism sheet. An upper prism sheet 202 is arranged on the lower prism sheet 203. A large number of prisms which extend in the direction orthogonal to the direction of the lower prism sheet 203, for example, in the longitudinal direction of the screen are formed on the upper prism sheet 202 at a fixed pitch. Due to such a constitution, light which spreads in the lateral direction of the screen from the backlight 20 is focused in the direction perpendicular to the screen of the liquid crystal display panel 10. In this manner, with the use of the lower prism sheet 203 and the upper prism sheet 202, the light which spreads in the longitudinal direction as well as in the lateral direction can be focused in the direction perpendicular to the screen.

An upper diffusion sheet 201 is arranged on the upper prism sheet 202. Prisms which extend in the fixed direction are formed on the prism sheet at a pitch of 50 μm, for example. That is, contrast stripes are formed at the pitch of 50 μm. On the liquid crystal display panel 10, scanning lines are formed in the lateral direction of the screen at a fixed pitch and data signal lines are formed in the longitudinal direction of the screen at a fixed pitch. Accordingly, depending on the scanning line pitch or the data signal line pitch, contrast stripes are formed. As a result, the contrast stripes of the prism and the contrast stripes of the liquid crystal display panel 10 interfere with each other thus generating moiré due to a diffusion action. The upper diffusion sheet 201 plays a role of reducing the moiré.

The above-explained optical sheets are mounted on the diffusion plate 205. Since the respective optical sheets have small thicknesses ranging from approximately 50 μm to 60 μm, the respective optical sheets exhibit the curvatures substantially equal to the curvature of the diffusion plate 205 by merely mounting the optical sheets on the diffusion plate 205. On the other hand, since the liquid crystal display panel 10 is housed in the frame 11, the liquid crystal display panel 10 exhibits the curvature substantially equal to the curvature of the preliminarily formed curved surface of the frame 11. Accordingly, the distance between the fluorescent lamps 30 which constitute the optical sources and the liquid crystal display panel 10 can be set to the fixed value and hence, the brightness of the screen can be set to a fixed value.

As described above, according to this embodiment, it is possible to realize the display device having the uniform screen brightness without making the constitution of the display device complicated even with respect to the liquid crystal display device having the curved screen. Further, according to this embodiment, the conventional technique applied to the liquid crystal display device having the direct backlight 20 can be used and hence, it is possible to manufacture the liquid crystal display device which allows the highly reliable screen to have the curved surface.

Figure 9:
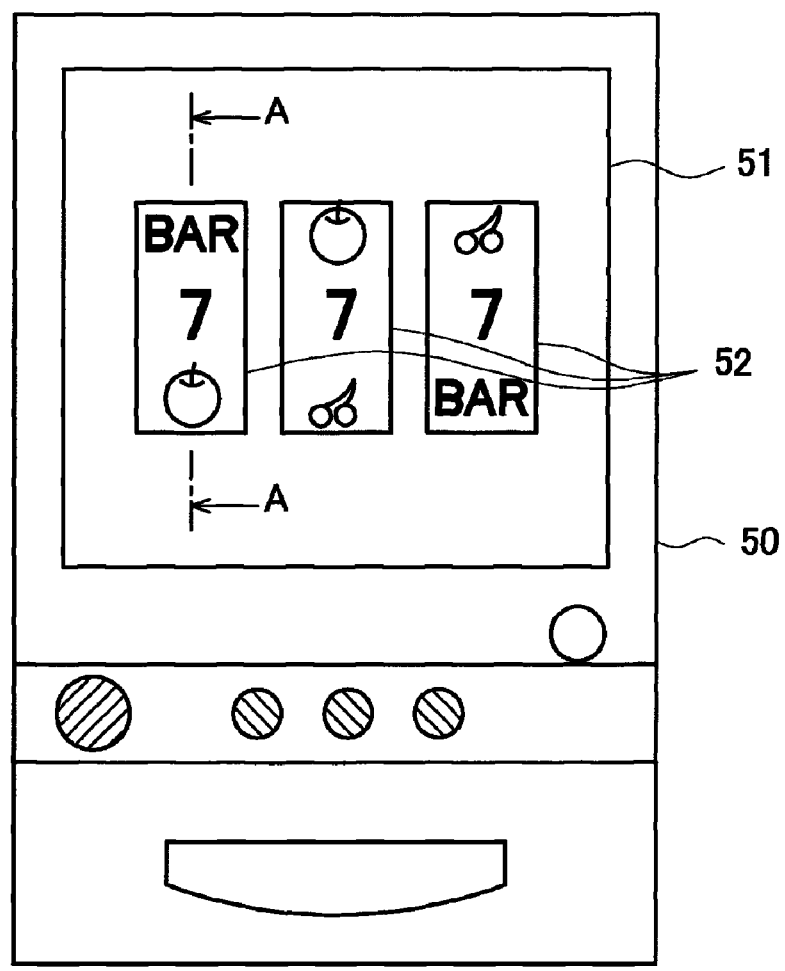
FIG. 9 is a front view of a slot gaming machine.

FIG. 9 shows an example in which the liquid crystal display device of this embodiment is used in a so-called slot gaming machine 50. A display screen 51 of the slot gaming machine 50 is formed of a large-sized liquid crystal screen 51. Three rectangular holes are formed in the vicinity of the center of the liquid crystal screen 51. Drums 52 which various information is written on surfaces thereof are set in the rectangular hole portions. A player plays with the rotating drums 52 together with information on the liquid crystal screens 51 while controlling respective buttons.

Figure 10:
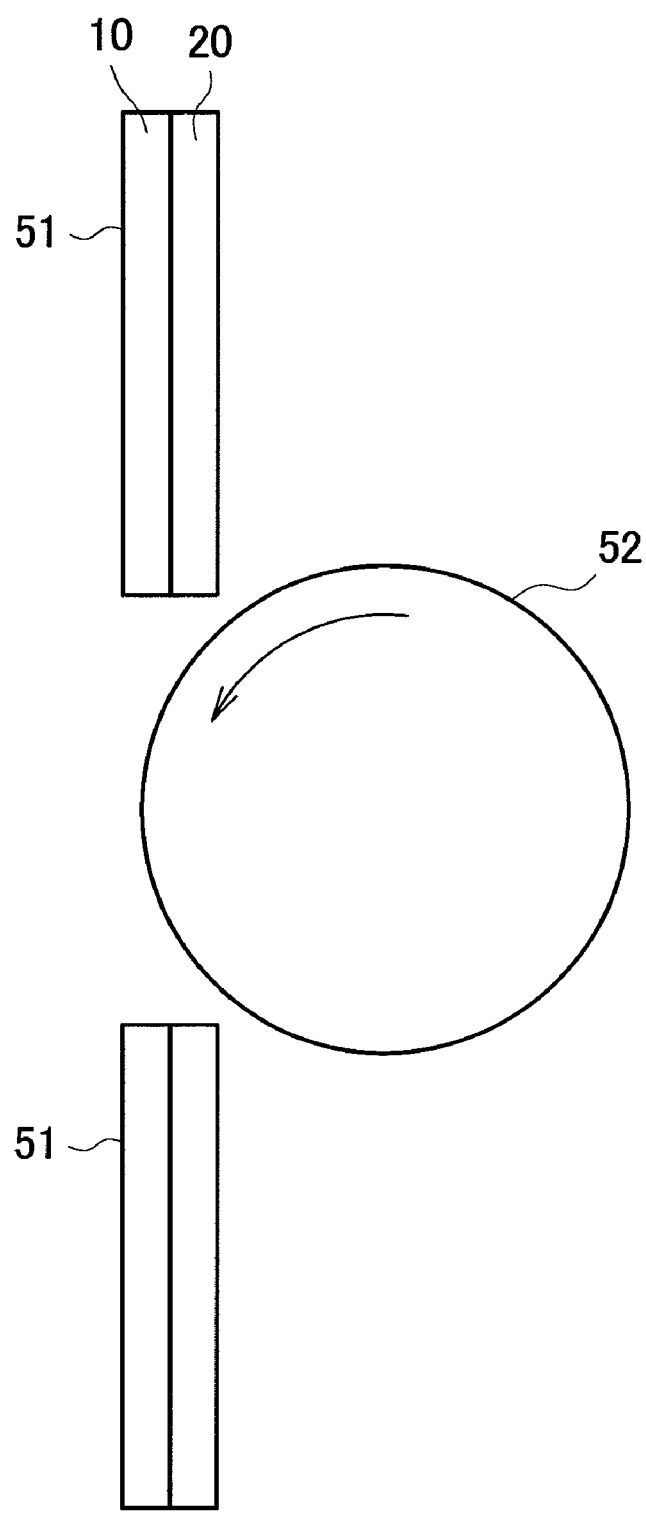
FIG. 10 is a cross-sectional view taken along a line A-A in FIG. 9 of a conventional liquid crystal display device.

FIG. 10 is a cross-sectional view of the slot gaming machine 50 taken along a line A-A in FIG. 9 by focusing on only the drum 52 and the liquid crystal display device in a conventional method. In FIG. 10, the display part 51 is formed of the liquid crystal display device and the liquid crystal display device is constituted of a liquid crystal display panel 10 and a backlight 20. The rectangular holes are formed in the center portions of the liquid crystal display device, and the drums 52 in which various information is written are arranged in these portions. The drums 52 are rotated in the arrow direction during the play.

However, in the conventional method shown in FIG. 10, it is necessary to interlockingly operate the rotating drums 52 and the liquid crystal display device and hence, the mechanical constitution becomes complicated. Further, it is necessary to frequently perform a model change of the slot gaming machine 50 to prevent players from getting bored with the play. Every time the model change is performed, it is necessary to change the mechanical constitution of the slot gaming machine 50 including the exchange of drums 52 and hence, parlor owners of the slot gaming machines have to bear a large economical burden.

Figure 11:
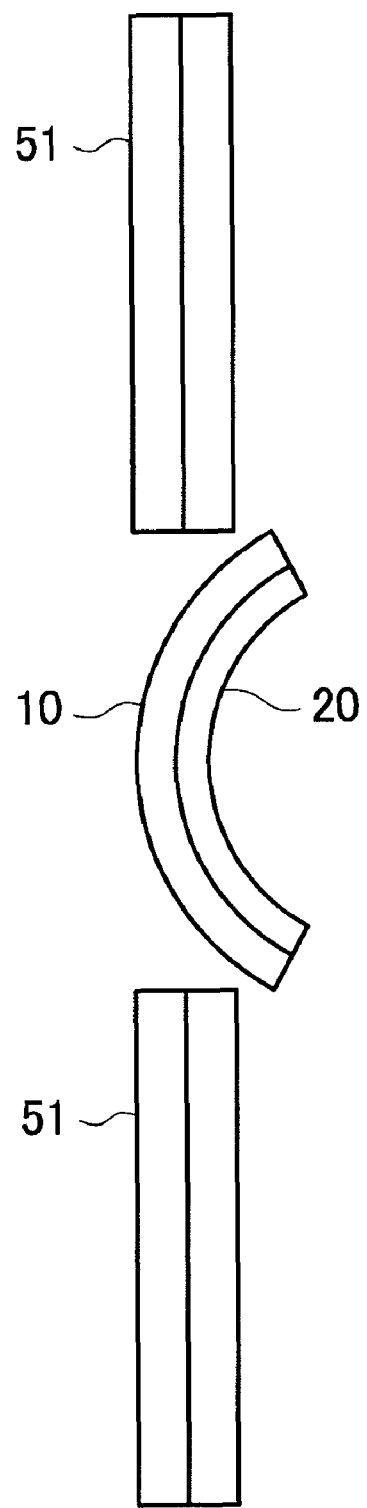
FIG. 11 is a cross-sectional view taken along a line A-A in FIG. 9 of the liquid crystal display device of the embodiment 1.

FIG. 11 shows an example in which the liquid crystal display device of this example is applied to the slot gaming machine 50. This example differs from the conventional example shown in FIG. 10 with respect to a point that the liquid crystal display device shown in FIG. 11 does not use the drums 52 and uses the liquid crystal display device of the present invention having the curved screen. In FIG. 11, an image as if the drums are rotated is displayed on curved liquid crystal display screen. Due to such constitution, the player has an illusion that the drums are rotated so that, as shown in FIG. 10, the player can enjoy the game in the same manner as the case in which the drums are actually rotated.

Advantages of this embodiment lies in that, in performing the model change, none of the exchange of drums 52, the exchange of the liquid crystal display device and the like are necessary and it is sufficient to change software. Due to such an advantage, an economical burden on the game parlor owner can be largely reduced. Although a display having an outwardly projecting curved surface may be also realized by a cathode ray tube, the cathode ray tube requires a large weight and a large depth to allow the cathode ray tube to have a large screen. Further, a panel of the cathode ray tube is formed by a press and hence, it is necessary to prepare a panel-glass-use press device for changing a curved surface and the preparation of the panel-glass-use press device pushes up an economical burden. Accordingly, the preparation of display devices having various curvatures is not realistic when the cathode ray tubes are used.

From this point of view, according to the liquid crystal display device of the present invention, to impart the curved surface to the display screen, it is sufficient to prepare the metal frame 11 for bending the liquid crystal display panel 10 and the socket 31 which arranges the fluorescent lamps 30 therein. In this manner, the present invention can cope with displays having various curved surfaces. Further, it is needless to say that the present invention uses the liquid crystal display device and hence, even when the liquid crystal display device is incorporated into the slot gaming machine 50 or the like, there arises no drawback relating to weight and depth of the slot gaming machine 50 or the like when the cathode ray tubes are used.

Embodiment 2

In the liquid crystal display device of the embodiment 1, the screen of the liquid crystal display device is outwardly projected. An advantage of the present invention which makes use of the liquid crystal display device can also form a recessed screen. By forming the recessed screen, the characteristics of the liquid crystal display device can be further enhanced.

Figure 12:
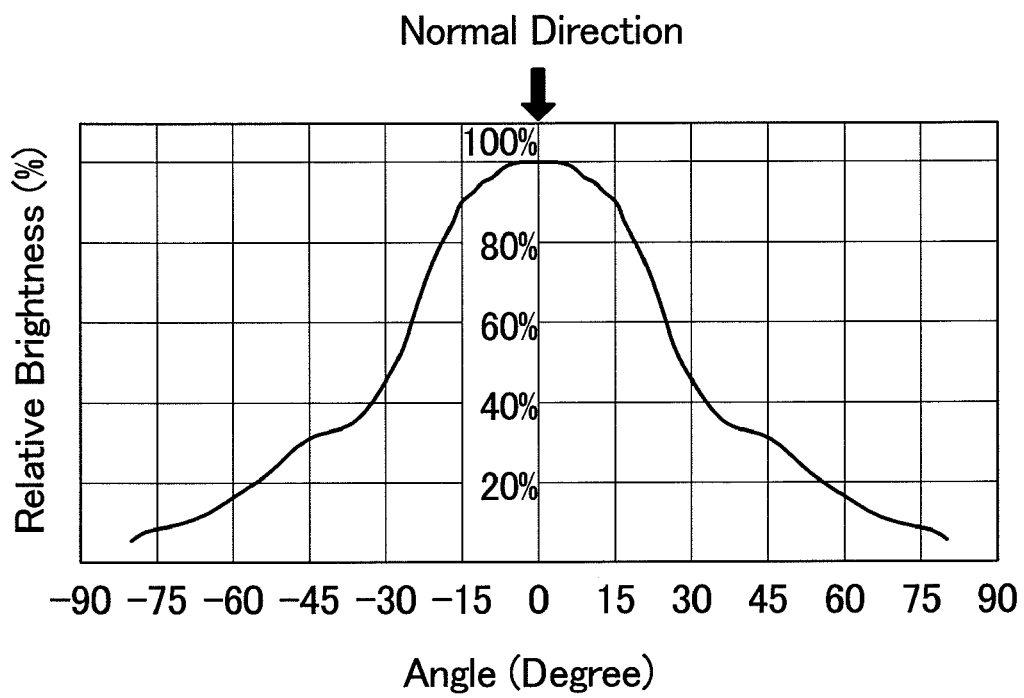
FIG. 12 is a view showing an example of viewing angle characteristics of a liquid crystal display panel.

FIG. 12 shows a viewing angle characteristic of the liquid crystal display panel 10. One of drawbacks in image quality of the liquid crystal display panel 10 lies in a change of brightness, chromaticity or the like depending a screen viewing angle. FIG. 12 shows the viewing angle characteristic of a usual TN-type liquid crystal display device. In FIG. 12, brightness is taken on an axis of ordinates, and brightness when the screen is viewed in the direction perpendicular to the screen is set to 100%. An angle at which the screen is viewed is taken on an axis of abscissas. That is, the angle when the screen is viewed in the direction perpendicular to the screen is set to 0 degree and the angles displaced from the direction perpendicular to the screen are taken on the axis of abscissas. As shown in FIG. 12, when the liquid crystal screen is displaced by 30 degrees from the direction perpendicular to the screen, the brightness is decreased to approximately 40%. Further, the reduction of brightness also differs for every color and there also arises a drawback that color is changed corresponding to a viewing angle.

This viewing angle characteristic differs depending on a type of liquid crystal display device. For example, liquid crystal used in IPS (In Plane Switching)-type liquid crystal display panel which controls the transmission of light through liquid crystal by rotating liquid crystal molecules in the direction parallel to the TFT substrate 101 exhibits the excellent viewing angle characteristic compared to liquid crystal used in a usual TN-type liquid crystal display panel. In any case, when the screen is flat or when the screen is projected outwardly, it is necessary to enhance the viewing angle characteristic of the liquid crystal display panel 10.

Figure 13:
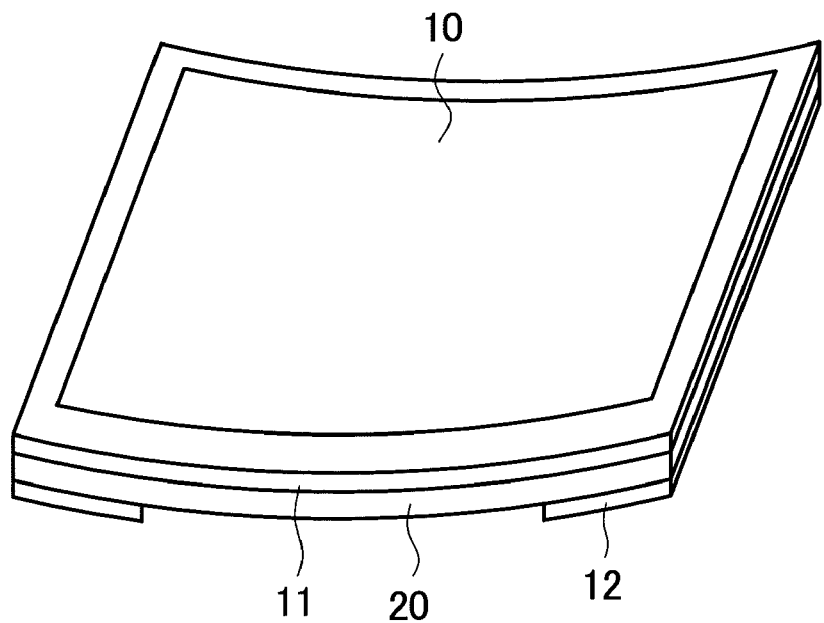
FIG. 13 is a view showing an appearance of a liquid crystal display device according to an embodiment 2.

FIG. 13 is an appearance view of the liquid crystal display device according to this embodiment. In FIG. 13, different from FIG. 1, the screen has an outwardly recessed shape. Except for the constitutional feature that the screen is outwardly recessed, other constitutional features of the embodiment are equal to the constitutional features of this embodiment shown in FIG. 1. That is, by installing the liquid crystal display panel 10 in a frame 11 which is outwardly recessed, the liquid crystal display panel 10 is bent to form a screen having a curved surface. In manufacturing the liquid crystal display panel 10 using glass, the relationship between a curvature radius of the liquid crystal display panel 10 and a thickness of the liquid crystal display panel 10 is set substantially equal to the corresponding relationship shown in FIG. 2. Also in this embodiment, in the same manner as the embodiment shown in FIG. 1, a backlight 20 is mounted on a back surface of the liquid crystal display panel 10, and an inverter cover 12 of an inverter for driving a light source of a backlight 20 is exposed.

A perspective view showing the arrangement of fluorescent lamps 30 in the inside of the backlight 20 of the liquid crystal display device in a see-through manner is obtained by reversing the curved surface of the embodiment 1 shown in FIG. 3. Further, in the same manner as the constitution shown in FIG. 4, for arranging the fluorescent lamps 30 on the curved surface, a socket 31 for supporting the fluorescent lamps 30 is formed with a curved surface. Further, the cross section shown in FIG. 13 is also obtained by reversing the curved surface of the cross section shown in FIG. 5.

Here, the display device of this embodiment having the outwardly recessed screen is particularly advantageous when the display device is used as a large display device for a television receiver set. Although the power consumption of the backlight 20 of the television receiver set or the like may be slightly increased, the brightness and the viewing angle characteristic become crucial tasks. Although the lower prism sheet 203, the upper prism sheet 202 and the like used in the constitution shown in FIG. 5 are advantageous in the enhancement of the front brightness, these parts are disadvantageous in view of the viewing angle characteristic. Further, the prism sheet brings about moiré and the lowering of optical transmissivity. Further, since the prism sheet is expensive, the television receiver set does not use the prism sheet in many cases.

Figure 14:
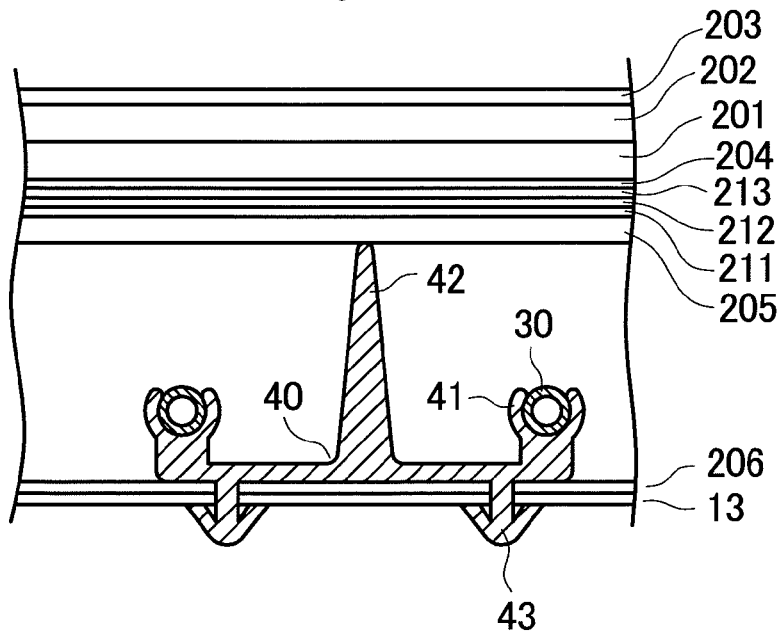
FIG. 14 is a cross-sectional view of an intermediate holder portion of a liquid crystal display device for a television receiver set.

Since the television receiver set has a large screen, intermediate holders 40 are used for supporting the fluorescent lamps 30. A shape, the manner of operation and the like of the intermediate holder 40 is basically equal to the shape, the manner of operation and the like of the intermediate holder 40 of the embodiment 1. FIG. 14 shows a cross section of the liquid crystal display device of the embodiment 2 at the intermediate holder 40 portion. The basic constitution of the liquid crystal display device of this embodiment is substantially equal to the basic constitution of the liquid crystal display device of the embodiment 1 shown in FIG. 6. The TV-use liquid crystal display device of the embodiment 2 differs from the liquid crystal display device of the embodiment 1 with respect to the optical sheet system as described above. In FIG. 14, in the same manner as the embodiment 1 shown in FIG. 6, two fluorescent lamps 30 are supported by fluorescent lamp holding portions 41 of the intermediate holder 40. Further, in the same manner as the embodiment 1 shown in FIG. 6, a spacer portion 42 of the intermediate holder 40 maintains distances between the fluorescent lamps 30 and the diffusion plate 205 to a fixed value.

The constitution shown in FIG. 14 differs from the constitution shown in FIG. 6 with respect to a group of the optical sheets mounted on a diffusion plate 205. In FIG. 14, three diffusion sheets consisting of a first diffusion sheet 211, a second diffusion sheet 212, and a third diffusion sheets 213 are used without using two prism sheets. Each diffusion sheet has a thickness of approximately 60 μm and irregularities are formed on surfaces thereof for diffusing light. Although four optical sheets are used in FIG. 6, only three diffusion sheets are used in FIG. 14. The transmission of light from the backlight 20 can be increased by an amount corresponding to the decreased number of optical sheets.

Further, with the use of the large number of diffusion sheets, light can be further dissipated thus enhancing the uniformity of brightness. The reason that three diffusion sheets are used in place of using one or two optical sheets is as follows. That is, to diffuse light, a large number of fine irregularities is formed on surfaces of the optical sheet when viewed microscopically. These fine irregularities function as prisms of a kind which collect light in the direction toward the liquid crystal display panel 10. Accordingly, in acquiring the same light diffusion effect, to compare one diffusion sheet with three diffusion sheets, the three diffusion sheets can acquire a prism effect more effectively. Accordingly, it is possible to collect light from a backlight 20 toward the liquid-crystal-display-panel-10 side without using an expensive prism sheet and, at the same time, without giving rise to a drawback on moiré.

The liquid crystal display panel 10 is arranged on the third diffusion sheet 213. In the same manner as the liquid crystal display panel 10 shown in FIG. 6, the liquid crystal display panel 10 shown in FIG. 14 is constituted of a TFT substrate 101, a color filter substrate 102, an upper polarizer 103 and a lower polarizer 104.

Figure 15:
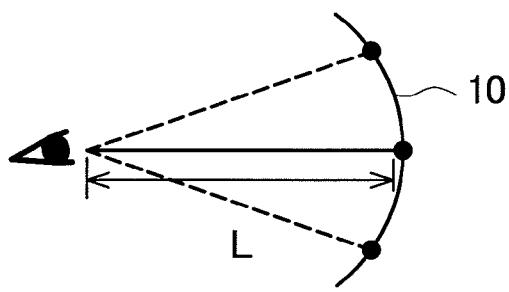
FIG. 15 is a schematic view showing a state in which a viewer watches a recessed screen with naked eyes.

This embodiment is extremely effective in the improvement of the viewing angle characteristic of the liquid crystal display when the screen is outwardly recessed. FIG. 15 shows such a state. When a liquid crystal screen is viewed from a front side, a viewing angle at a periphery of the screen must be taken into consideration. In this embodiment, as shown in FIG. 15, the periphery of the screen is outwardly recessed. Accordingly, compared to a screen which is flat, an angle at which the liquid crystal screen is viewed becomes more close to a right angle. This state is close to a state that a front side of the screen is viewed.

As shown in FIG. 12, with the improvement of the viewing angle by only approximately 20 degrees, the brightness characteristic can be largely enhanced. The same goes for the color difference. Such an advantageous effect is particularly effective when a position at which a display is viewed is fixed as in the case of a display in an automobile. As shown in FIG. 15, by making the position at which the display is viewed agree with a curvature radius of the display, a clear image substantially equal to an image as viewed from a front side can be viewed when a viewer views any position of the display screen. For example, in case of the display in the automobile, assuming a distance between the display and a viewer to 50 cm, by setting the curvature radius of the display to 50 cm, it is possible to acquire an image similar to an image acquired by viewing the screen from the front side over the whole screen of the display. Even when the curvature of the display is not sufficient, it is possible to acquire a large brightness characteristic improving effect by merely imparting the slight curvature.

Figure 16:
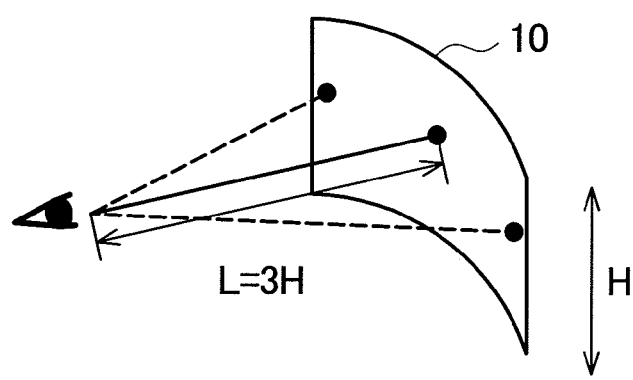
FIG. 16 is a schematic view showing a state in which a viewer watches a recessed screen of a television receiver set with naked eyes.

FIG. 16 is an explanatory view of a case when the display is used for a television receiver set. In FIG. 16, the liquid crystal display panel 10 which constitutes the display has an outwardly recessed curved surface. In case of the television receiver set, an optimum position for watching the television receiver set is considered to be a position which is spaced-apart from the screen by a distance twice to four times as large as a vertical size H of the screen. FIG. 16 shows an example in which a viewer watches a television receiver set at a position spaced-apart from the screen by 3 H.

When the viewer watches a television receiver set at this position, by setting the curvature radius of the screen to 3 H, the viewer can watch a clear image at any position of the screen in the same manner as the case in which the viewer watches the center of the screen. In case of the liquid crystal display panel 10, the viewing angle characteristic is not largely changed in the vertical direction of the screen compared to the horizontal direction of the screen. Accordingly, it is sufficient to impart the curvature to the horizontal direction of the screen. That is, in the liquid crystal television receiver set, the invention of this embodiment which uses fluorescent lamps 30 as the backlight and imparts the curved surface to the arrangement direction of the backlight 20 is extremely suitable.

For example, when the viewer watches a 37-inch television receiver set having an aspect ratio of 16:9, a vertical length of the screen becomes 46 cm. In this case, the viewing position spaced-apart by the size 3 H becomes approximately 1.4 m. Accordingly, the viewer can acquire the favorable image over the whole screen by imparting curvature radius of 1400 mm to the screen. On the other hand, when the position which is spaced-apart from the screen by the distance four times as large as the screen vertical size H, that is, the position spaced-apart from the screen by 4 H is considered as the optimum position where the viewer watches the television receiver set, the curvature radius of the screen in the horizontal direction may be set to 4 H. In case of this 37-inch television receiver set, a curvature radius of approximately 1870 mm may be imparted to the liquid crystal display panel.

What is claimed is:

1. A liquid crystal display device comprising:
    a liquid crystal display panel including a TFT substrate on which pixel electrodes and TFTs are formed, a color filter substrate on which color filters are formed, liquid crystal sandwiched between the color filter substrate and the TFT substrate, an upper polarizer adhered to an upper surface of the color filter substrate, and a lower polarizer adhered to a lower surface of the TFT substrate; and
    a backlight, wherein
    a display region of the liquid crystal display panel is formed into a rectangular curved surface which is recessed with respect to the outside, a curvature radius R of the display region in the long-side direction is twice to four times as large as a length H of the display region in the short-side direction, the backlight includes a light source and a curved diffusion plate, the light source includes a plurality of fluorescent lamps, and distances between the fluorescent lamps and the liquid crystal display panel are set to a fixed value.

2. A liquid crystal display device according to claim 1, wherein the curved surface of the liquid crystal display panel and a curved surface of the diffusion plate agree with each other.

3. A liquid crystal display device according to claim 1, wherein the distances between the diffusion plate and the fluorescent lamps are, assuming an average of the distances between the respective fluorescent lamps and the diffusion plate as m, set to a value which falls within a range of m±10%.

4. A liquid crystal display device according to claim 1, wherein the TFT substrate and the color filter substrate are made of glass.

5. A liquid crystal display device according to claim 1, wherein the curved surface of the liquid crystal display panel and the curved surface of the diffusion plate are formed into a cylindrical shape.

6. A liquid crystal display device comprising:
    a liquid crystal display panel including a TFT substrate on which pixel electrodes and TFTs are formed, a color filter substrate on which color filters are formed, liquid crystal sandwiched between the floor filter substrate and the TFT substrate, an upper polarizer adhered to an upper surface of the color filter substrate, and a lower polarizer adhered to a lower surface of the TFT substrate; and
    a backlight;
    wherein a display region of the liquid crystal display panel is formed into a rectangular curved surface which is recessed with respect to the outside, a curvature radius R of the display region in the long-side direction is twice to four times as large as a length H of the display region in the short-side direction, the backlight includes a light source and a curved diffusion plate, the light source includes a plurality of fluorescent lamps; and
    wherein distances between the fluorescent lamps and the liquid crystal display panel are, assuming an average of the distances between the respective fluorescent lamps and the liquid crystal display panel as m, set to a value which falls within a range of m±10%.

7. A liquid crystal display device according to claim 6, wherein the curved surface of the liquid crystal display panel and a curved surface of the diffusion plate agree with each other.

8. The liquid crystal display device according to claim 6, wherein the distances between the diffusion plate and the fluorescent lamps are, assuming an average of the distances between the respective fluorescent lamps and the diffusion plate as n, set to a value which falls within a range of n±10%.

9. The liquid crystal display device according to claim 6, wherein the TFT substrate and the color filter substrate are made of glass.

10. The liquid crystal display device according to claim 6, wherein the curved surface of the liquid crystal display panel and the curved surface of the diffusion plate are formed cylindrical shape.

* * * * *